May 11, 1965  G. B. MYAIDA ETAL  3,182,634
OBSTRUCTED ENTRANCE TYPE BIRDHOUSE
Filed Dec. 10, 1963  2 Sheets-Sheet 1
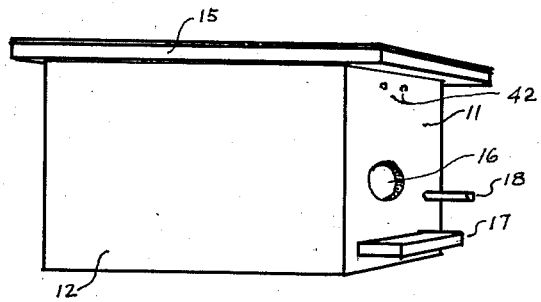
FIG.-1.
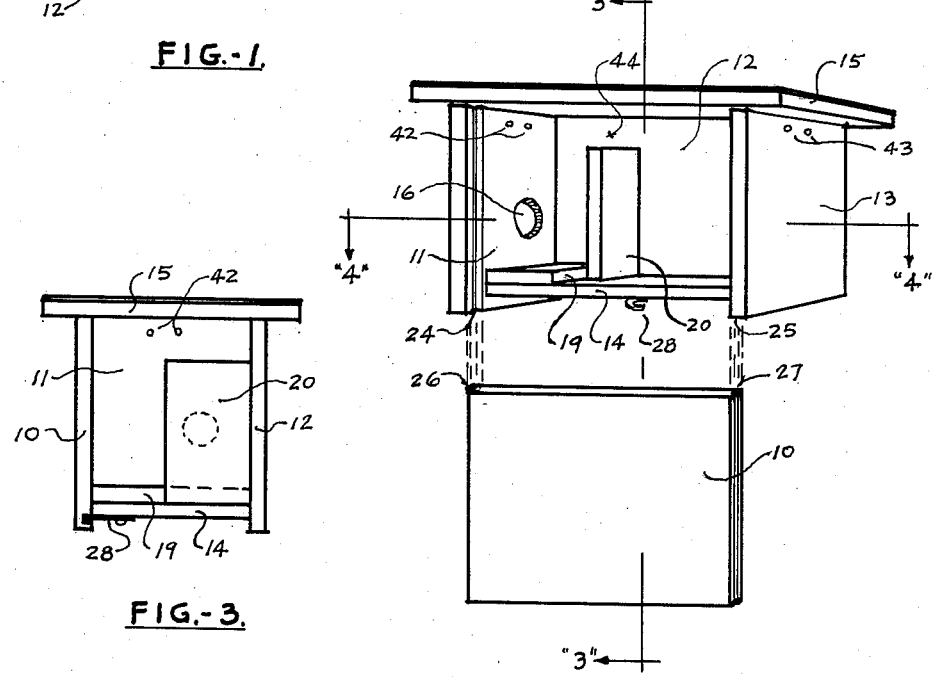
FIG.-3.
FIG.-2.
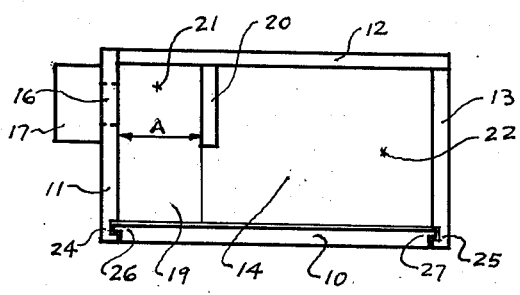
FIG.-4.
INVENTORS
GRACE B. MYAIDA.
BY SHOGO J. MYAIDA.
Frank G. Bauer
ATTORNEY May 11, 1965  G. B. MYAIDA ETAL  3,182,634
OBSTRUCTED ENTRANCE TYPE BIRDHOUSE
Filed Dec. 10, 1963  2 Sheets-Sheet 2

INVENTORS
GRACE B. MYAIDA.
BY SHOGO J. MYAIDA.

Frank G. Bower
ATTORNEY

United States Patent Office 3,182,634
Patented May 11, 1965

3,182,634
OBSTRUCTED ENTRANCE TYPE BIRDHOUSE
Grace B. Myaida and Shogo J. Myaida, both of
21 Searingtown Road, Albertson, N.Y.
Filed Dec. 10, 1963, Ser. No. 329,550
7 Claims. (Cl. 119—23)

This invention relates to birdhouses for nesting birds and is directed particularly to the protection of the nest and the eggs or nestlings therein.

The nests of small birds are quite often attacked and plundered by large birds, such as starlings, and by cats, squirrels and the like. It is, therefore, desirable to provide nesting areas that are protected from such molestation. A birdhouse providing protection must also be attractive to the small birds and encourage the birds into the nesting area out of reach of intruders. It is also desirable to increase the attractiveness of the houses to the birds that the nesting area be dry and protected from the elements and ventilated to provide proper air circulation.

Birdhouses embodying the invention accomplishing the foregoing objects are set forth in the following description and drawings, in which FIG. 1 is an exterior perspective view of one form of the birdhouse;

FIG. 2 is a rear perspective view of the birdhouse with the rear panel dropped to provide an interior view;

FIG. 3 is a sectional view taken along lines 3—3 of FIG. 2;

FIG. 4 is a sectional view taken along lines 4—4 of FIG. 2;

Figure 7:
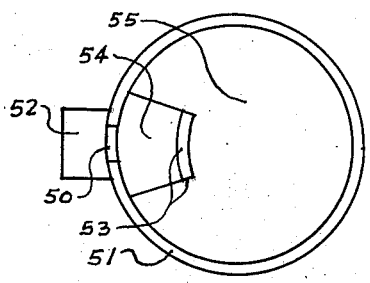
Figure 8:
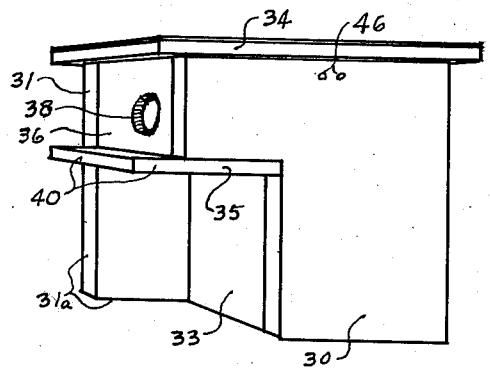
Figure 9:
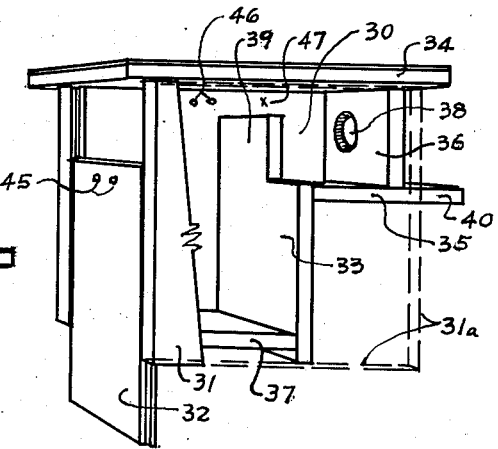

FIG. 7 illustates a circular embodiment of the birdhouse with a partial partition; and FIGS. 8 and 9 illustrate a birdhouse with a recessed nesting area.

Referring to the drawings, the birdhouse of FIGS. 1 and 2 has four walls 10, 11, 12 and 13 forming a rear panel, side panel, front panel and side panel, respectively. A floor or bottom wall 14 is provided and a flat roof 15. Entrance orifice 16 is provided in the side wall 11 adjacent to the wall 12. A landing step 17 and a perch 18 are provided on the outside of the birdhouse with the landing step underneath the opening 16. On the inside a platform piece 19 is provided extending along the side wall 11. A partial partition 20 extends generally longitudinal to the side wall 11 from the front panel 12 and faces the orifice 16 to form a vestibule area 21. The vestibule area has a width A which is approximately twice the diameter or horizontal width of the opening 16. A small bird entering through the orifice 16 moves into the vestibule area 21 and sees that the nesting area 22 is on the other side of the partition 20. The vestibule area 21 is too small to accommodate a nest, so the bird moves to the larger nesting area 22 on the other side of the partition 20 from the orifice 16.

Figure 5:
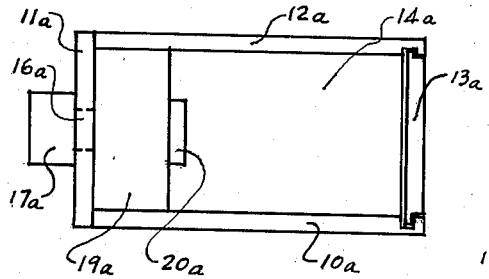
FIGS. 5 and 6 illustrate other embodiments of the birdhouse.

In FIG. 5 the orifice 16a is centered in the wall 11a with the partition 20a centered between the walls 10a and 12a and spaced the same distance from the orifice as in the embodiment of FIGS. 1 to 4.

Figure 6:
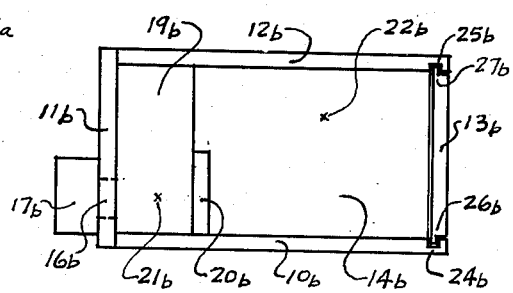

In FIG. 6 the orifice 16b is on the opposite end of the wall 11b so that the bird moving into the house through the orifice 16b moves in the opposite direction to the movement in the case of the embodiment of FIG. 4. The partial partition extends from wall 10b forming passage at the end with wall 12b.

In FIG. 7 a circular birdhouse is illustrated with an entrance orifice 50 in the cylindrical wall 51. The partition 53 is spaced approximately twice the diameter of the orifice from the wall 51 to divide the house into a vestibule area 54 and a nesting area 55. A landing step 52 is provided under orifice 50.

As illustrated in FIGS. 2 and 4 the sides 11 and 13 have grooves 24 and 25 for receiving tongues 26 and 27 on the ends of the panel 10. The panel 10 is then easily slid into place closing the birdhouse. Latch means 28 may be provided to lock the panel in place. This permits the interior of the birdhouse to be exposed at the end of the nesting season and cleaned for the occupants of the following season.

In the embodiments of FIGS. 8 and 9 the nesting area is dropped below the vestibule area in order to accommodate those birds who desire to place their nests in a recess. The birdhouse has a front panel 30, a rear panel 31 and side walls 32, 33. A flat roof 34 is provided. The side wall 33 extends upwardly part way and terminates at the platform piece 35 which has a side wall 36 closing the side of the birdhouse. The nesting area has a bottom 37 recessed below the platform 35. The entrance orifice 38 is in the side wall 36 and the side panel 33 has a partial partition 39 extending upwardly and facing the entrance orifice 38. The relationship of the partial panel 39 and the orifice 38 is the same as that illustrated in FIGS. 4 to 7. The rear panel 31 extends at 31a to form a full backing to the birdhouse. The platform 35 extends outwardly to the side to form a landing step 40 outside of the orifice 38. The side wall is slideably fitted in the ends of the front and rear walls to permit the nesting area to be exposed for cleaning the birdhouse. As illustrated in FIG. 9 the side wall 32 may be slideably mounted in the front and rear panels 30 and 31 by a tongue and groove structure similar to that of FIGS. 2 and 4 to make the inside available.

The birdhouses provide for a circulation of air while protecting the nest from rain and wind. Holes 42, 43 are provided in side walls 11 and 13, FIG. 2, and a space 44 is provided between the top of the partition and the roof 15. In FIGS. 8 and 9 holes 45 and 46 are provided in the side walls 32 and 30 and a space 47 is provided over the partition.

The nesting area is protected from intruders. Large wild birds which are very destructive of the nests of smaller birds can insert their heads through the entering orifice but are blocked by the facing partition 20 of FIGS. 2, 3 and 4, 20a of FIG. 5, 20b of FIG. 6, 53 of FIG. 7 and 39 of FIG. 9. The partition is spaced from the orifice a short distance to discourage the smaller birds from building nests at the entering orifice where they would be accessible to the large birds. Also cats and squirrels can insert a paw in the opening but will be blocked by the partition.

Thus the partition divides the inside into two areas and provides protection to the larger inner nesting area while also providing for circulation of air.

We claim:

1. A birdhouse having four walls forming a nesting area and a smaller vestibule area providing ingress and egress to the nesting area, an orifice in one of said walls having a given horizontal width, a partial partition extending generally longitudinal to said orifice wall and crosswise to the path of an entering bird from said orifice and spaced therefrom a distance generally twice the width of the orifice to form the vestibule area and spaced from one of the walls contiguous to the orifice wall to form a passage around said partition and said nesting area to render said vestibule area undesirable for nesting and to protect said nesting area from an intruder.

2. A birdhouse comprising wall means defining an enclosed chamber, a portion of said wall means having an orifice for passing small birds, an interior partition extending generally parallel to the portion of said wall means containing said orifice and facing said orifice a distance therefrom generally twice the width of said orifice to separate said chamber into a small non-nesting vestibule area and a larger nesting area.

3. A birdhouse as set forth in claim 2 wherein said wall means comprises front and rear walls and side walls extending therebetween, said entrance orifice in one of said side walls and said partition extending parallel to said orifice side wall.

4. A birdhouse as set forth in claim 3 wherein said orifice and partition are adjacent to said front wall.

5. A birdhouse as set forth in claim 3 wherein said orifice and partition are adjacent to said rear wall.

6. A birdhouse as set forth in claim 3 wherein said orifice and partition are centered between said front and rear walls.

7. A birdhouse as set forth in claim 2 wherein said wall means is cylindrical and said partition is curved.

References Cited by the Examiner

UNITED STATES PATENTS

| | | | |
|---|---|---|---|
| 88,799 | 4/69 | Murdock | 119—23 |
| 2,932,279 | 5/58 | Giles | 119—15 |
| 3,017,858 | 1/62 | Brown | 119—23 |

FOREIGN PATENTS 697,238  10/40  Germany.

SAMUEL KOREN, *Primary Examiner.*

ALDRICH F. MEDBERY, *Examiner.*